May 8, 1928.
N. I. GRIFFIN
DISHWASHING MECHANISM
Filed April 12, 1926
1,668,808
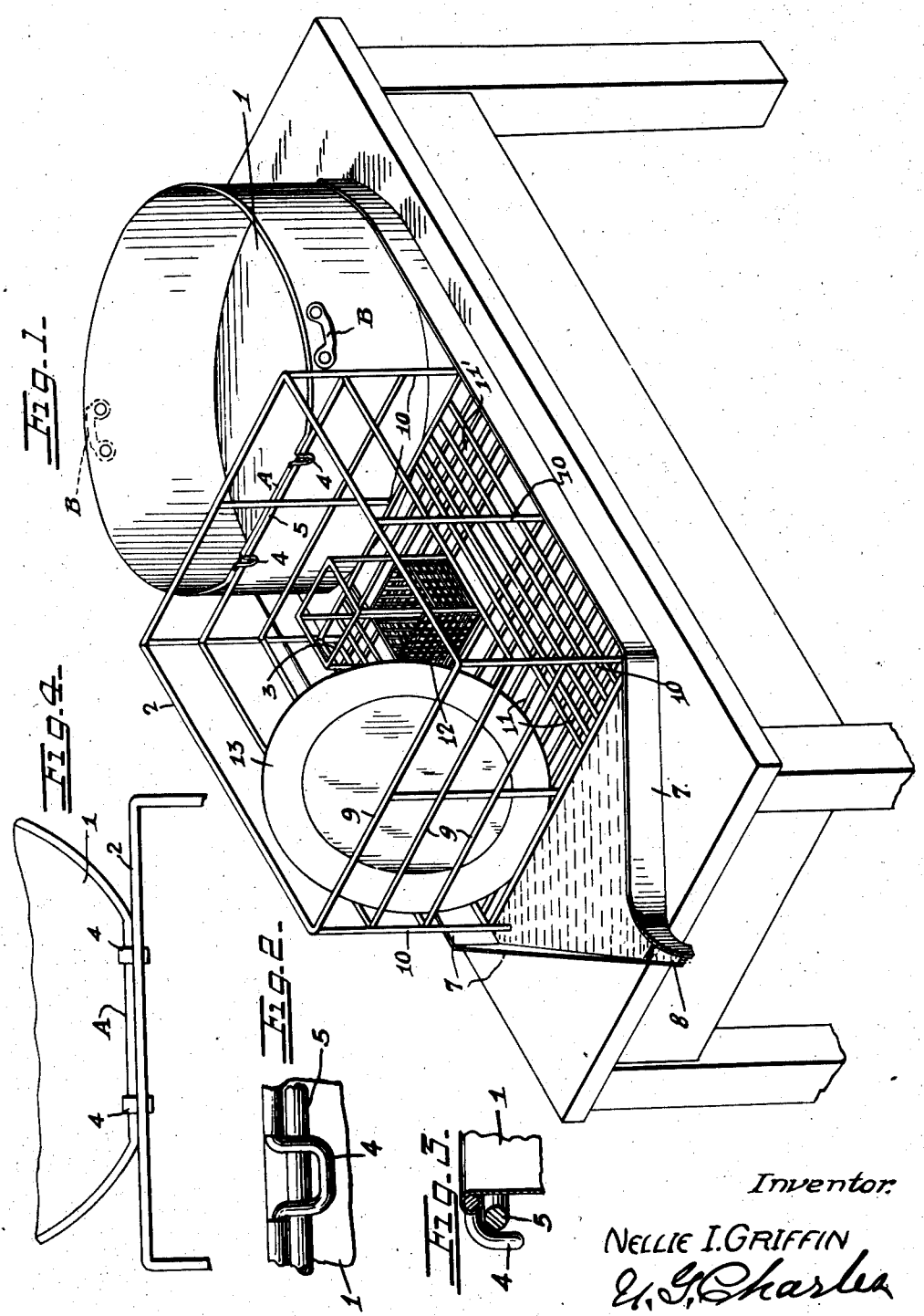
Inventor.
NELLIE I. GRIFFIN Patented May 8, 1928.

1,668,808

UNITED STATES PATENT OFFICE.

NELLIE IDELL GRIFFIN, OF WICHITA, KANSAS.

DISHWASHING MECHANISM.

Application filed April 12, 1926. Serial No. 101,426.

My invention relates to a sanitary mechanism for dish washing and has for its chief object, means for scalding the dishes after they have been cleaned by washing.

A further object of my invention is to provide a mechanism comprising a dish pan, a crib, and a tray neatly fitted together in working relation to each other.

A still further object of my invention is to provide a mechanism that will immediately dispose of the water used for scalding the dishes.

A still further object of my invention is to construct a crib in such a way that articles such as plates, saucers, spoons, knives, forks, etc., may be supported vertically allowing the water to pass freely therefrom during the process of scalding.

These and other objects will hereinafter be more fully explained.

Referring to the drawings:

Fig. 1 is a perspective view of the mechanism positioned on a table.

Fig. 2 is an enlarged detailed drawing of the dish pan hooks engaging with one of the members of the rack.

Fig. 3 is a transverse view of Fig. 2, partly in section.

Fig. 4 is a fragmentary plan view showing the relative position of the crib to the pan.

The mechanism herein disclosed consists of a dish pan 1, a crib 2; said crib having a concentrically positioned crib 3, the said pan and crib being connected by hooks 4 which are integral with the rim of the pan and adapted to engage on a rod 5 of the crib; 6 is a tray adapted to receive the pan and crib as shown in Fig. 1. On one end of the tray is a spout 8 arranged so the accumulation of water will flow freely therefrom into a container.

The crib is composed of a plurality of horizontal rods 9 attached to vertical members 10. The bottom consists of a plurality of rods 11 distributed between the crib 3 and the two sides of the crib 2, and transversely positioned on said rods is a plurality or rods 11' distributed between the crib 3 and the transverse sides of the crib 2, the said rods being spaced to receive the edge of the dishes 13 as they recline against the sides of the crib 3 or the crib 2. This means will prevent them from sliding outward at the bottom and also functions as a spacing means for the lower edges thereof, and being so positioned will allow the hot water to flow freely over the surface of all of the dishes. Note in Fig. 1 that the bottom above referred to is spaced a short distance from the lower extremity of the vertical corner members, by which means the water flows freely from the tray.

Concentrically positioned within the crib 2 and resting on the rack bottom thereof is a crib 3 adapted to vertically support knives, forks, spoons and the like. On the lower portion of the last said crib is a metal screen 12 attached to the corners and a similar screen to the bottom, the object of which is to prevent the articles contained therein from passing through, or protrude from the sides.

The pan 1 being placed in close proximity to the crib 2 has a straight portion on the side thereof as at A to fit snugly against the horizontal rods of said crib. By this arrangement the pan cannot be turned or placed in the tray in such a way as to discontinue the handling thereof by the handles B which are positioned on the diametrical axis; the relation of which is angling from the plane of the straight side of the pan.

To operate the mechanism herein described is as follows: The pan being filled with water in which the dishes are washed they are then placed in the crib on edge, and the knives, forks and spoons will be placed vertically in the crib 3; then boiling water is poured over the articles as a sterilizing process, the articles being so positioned, the water will flow freely therefrom to the tray beneath and from thence through the spout to a container. The dishes are then dried and removed to storage.

It will be understood that the pan and crib may be placed and operated within a sink, eliminating the use of the tray.

Such modifications may be employed as lie within the scope of the appended claim.

Having thus described my invention, what I claim as new and desire to secure by Letters Patent is:

In a dish washing mechanism, in combination, a tray having an upstanding marginal flange thereabout, terminating in a spout at one end and being semi-circular at its opposite end, a pan having a straight portion on one side thereof and hooks positioned on the straight portion at the top of the pan, said pan fitting snugly in the semi-circular end of the tray, a dish crib fitting in the tray having a flat side to abut the flat side of said pan, said flat side of the dish crib having a rod to engage with the hooks on the pan, and means in said dish crib to engage the lower peripheral edges of the dishes to support them in said crib.

NELLIE IDELL GRIFFIN.